Dec. 17, 1968      L. J. CHMIELOWIEC      3,416,703
REINFORCED CONTAINER
Filed Feb. 24, 1966
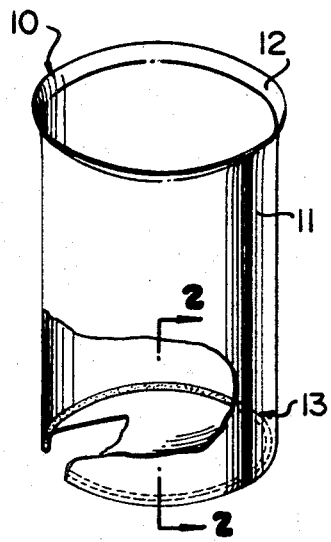
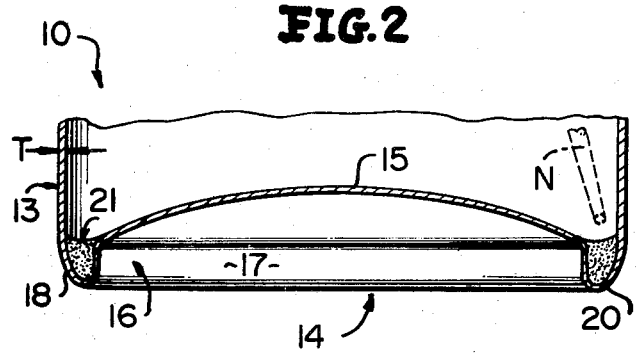
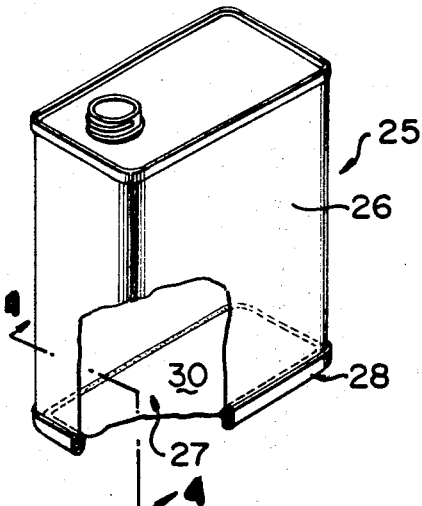
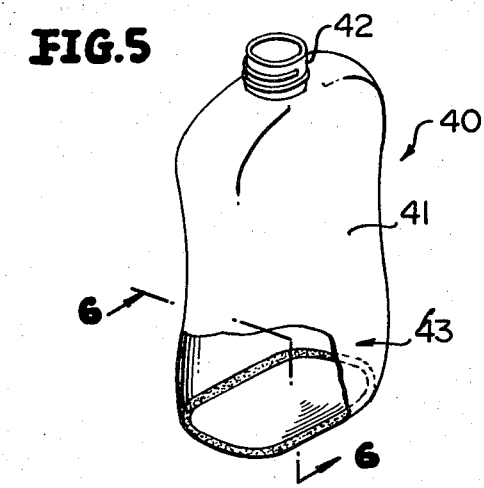
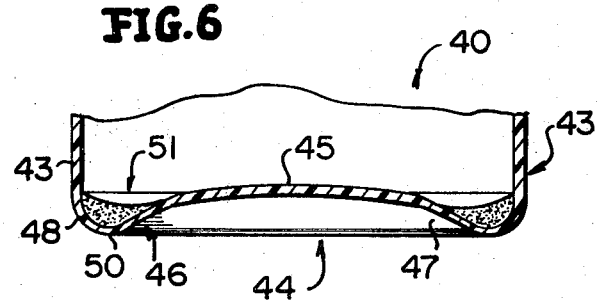
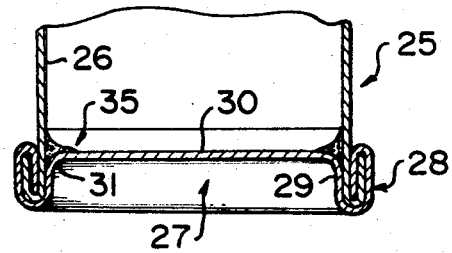
INVENTOR
LOUIS J. CHMIELOWIEC
BY Mason, Porter, Diller & Brown
ATTORNEYS

United States Patent Office 3,416,703
Patented Dec. 17, 1968

3,416,703
REINFORCED CONTAINER
Louis J. Chmielowiec, South Holland, Ill., assignor to Continental Can Company, Inc., New York, N.Y., a corporation of New York
Filed Feb. 24, 1966, Ser. No. 529,777
9 Claims. (Cl. 220—73)

ABSTRACT OF THE DISCLOSURE

This disclosure is directed to drawn, extruded, blow molded or similar containers in which a juncture portion uniting an end to a container body is undesirably weakened by the flow of the material from which the container is constructed during the manufacture thereof. The invention provides a reinforcing of such containers by the application of reinforcing means consisting solely of a layer of adhesive which is adhesively compatible with the material of and adhesively bonded to the juncture portion for reinforcing the latter. The reinforcing means is preferably thermosetting cement which is adhesively compatible with the container and is non-reactive with a product adapted for packaging therein.

---

There have been many recent developments in the formation of containers over the recent years, particularly with respect to the formation of easy-open type can ends. Many of these developments relate to the forming of can ends of thinner gauge metal both for the purpose of facilitating the opening of the associated container and for purposes of economy. However, very little has been done to overcome the objectionable thinning of flowable material during the formation of, for example, extruded or drawn container bodies, molded plastic or glass containers or even double-seamed can bodies in which some metal-flow occurs during a seaming operation. Such containers, particularly when constructed by material-flowing operations (drawing, extruding, blow-molding, injection molding etc.) tend to thin appreciably and undesirably at certain portions thereof. Typical of such undesirable thinning occurs during the blow-molding of a bottle or similar container from polymeric material, such as polyethylene. Such containers generally include a body wall, a recessed end panel, and a peripheral juncture portion connecting the body wall to the recessed end panel. During the blow-molding of the container the material forming the juncture portion is caused to flow more than the material of the end panel of the body wall, thereby resulting in an appreciable thinning of the wall thickness in the juncture portion accompanied by a resulting weakness in this area of the container as compared to remaining portions of the container.

A like thinning of flowed material also occurs during the extruding or drawing of metallic or plastic containers. In these cases the material joining an end panel to a body wall of a container is generally stretched or flowed appreciably more than other areas and thins, thereby forming a peripheral weakened portion which is obviously undesirable.

Undesirable thinning occurs to a certain extent in the formation of double seamed can or container bodies. It is during the formation of the conventional double seam that distortion of the chuck wall thereof occurs and, if not reinforced, buckling and bulging of the container body end panel will occur, particularly when the container is subjected to high internal pressure.

Until now, various approaches toward the reinforcement of particular portions of containers have been attempted but few have proven commercially acceptable and economically feasible. For example, in the construction of conventional double seamed cans reinforcement is provided by reversely folding the metal of the can end adjacent the chuck wall upon itself. As can be readily appreciated, this reverse folding of the metal not only requires additional metal, but also requires additional expensive folding apparatus and time consuming folding steps.

Injection molded or blow-molded containers have been reinforced by beginning with a thicker than required parison to accommodate or compensate for excessive flowing of material at certain portions of a container body. However, while this practice compensates for providing a desired thickness at areas of maximum material flow, it will be readily appreciated that the wall thickness of the container is undesirably thick in areas of moderate to minimum material flow. This results in the formation of a container which is amply reinforced but is commercially impractical from a cost standpoint due to the excessive amount of additional material required to reinforce the container.

In view of the foregoing, it is a primary object of this invention to reinforce any portion of a container body which is of an undesirably thin-wall construction caused by excessive material flow during the manufacture of the container body by applying reinforcing means internally of the container body to any such thin-walled portion.

It is a further object of this invention to provide a container including a container body having at least one closed end joined to the body along a weakened juncture portion, and means internally of the body at the weakened juncture portion for reinforcing the latter.

A further object of this invention is to provide a novel container of the type immediately above-described in which the container body is of a predetermined thickness and the juncture portion is of a thickness less than the predetermined thickness due to undesirable and excessive material flow during the manufacture of the container and the reinforcing means effects a thickening of the juncture portion to an extent at least comparable to the predetermined container body thickness whereby deformation at the juncture portion is precluded, particularly under high internal pressure.

Still another object of this invention is to provide a novel container of the type immediately above-described wherein the reinforcing means is a bonding media and the container is of a molded polymeric material construction or of a drawn or extruded polymeric or non-polymeric construction.

With the above, and other objects in view that will hereinafter appear, the nature of the invention will be more clearly understood by reference to the following detailed description, the appended claims and the several views illustrated in the accompanying drawing.

In the drawing:

FIGURE 1 is a top perspective view with parts broken away for clarity of a container constructed in accordance with this invention, and illustrates means reinforcing a juncture portion of the container between a container body and an end closure thereof.

FIGURE 2 is an enlarged fragmentary sectional view taken generally along line 2—2 of FIGURE 1, and more clearly illustrates an undesirable thin-walled construction of the juncture portion which is in the form of a bead, and the reinforcing means housed within the bead.

FIGURE 3 is a top perspective view with a portion removed for clarity of another container constructed in accordance with this invention, and illustrates reinforcing means at a juncture portion between an end closure and a body wall of the container.

FIGURE 4 is an enlarged sectional view taken generally along line 4—4 of FIGURE 3, and more clearly illustrates the reinforcing means at the juncture portion of the end closure and body wall.

FIGURE 5 is a top perspective view with a portion broken away for clarity of a molded plastic container, and illustrates reinforcing means at a weakened juncture portion between an end closure and body wall thereof.

FIGURE 6 is an enlarged fragmentary sectional view taken generally along line 6—6 of FIGURE 5, and more clearly illustrates the thin-wall construction of the juncture portion and the reinforcing means seated therein.

A novel container constructed in accordance with this invention is best illustrated in FIGURES 1 and 2 of the drawing and is generally designated by the reference numeral 10. The container 10 includes a container body 11 of a tubular, cylindrical configuration terminating in an upper radially outwardly directed flange 12. A lower end portion of the container body 11 is generaly designated by the reference numeral 13 and includes an end closure, generally designated by the reference numeral 14. The end closure 14 includes an outwardly concavely contoured end wall 15 joined to the lower portion 13 of the container body 11 by a juncture portion 16, which is best illustrated in FIGURE 2 of the drawing. The juncture portion 16 is in the form of a peripheral, axially upwardly opening bead which is defined by an inner peripheral wall 17, an outer peripheral wall 18, and a radius portion 20. The container 10 is constructed from polymeric or non-polymeric maerial and is either drawn or extruded to the configuration illustrated in FIGURES 1 and 2 of the drawing. During such a drawing or extruded operation, the material from which the container 10 is constructed, be it metallic or plastic material, tends to flow or stretch appreciably more in some areas than in other areas of the container. This is true of the juncture portion 16 whose walls 17, 18 and juncture portion 20 tend to thin appreciably and undesirably as compared to a desired predetermined thickness T of the container body 11. Therefore, while the thickness T of the container body 11 and of the recessed end wall 15 is sufficient to impart desired rigidity to the container 10, the juncture portion 14 is comparatively weak and has insufficient rigidity to resist deformation due to, for example, internal pressures of a product eventually packaged in the container.

In accordance with this invention the bead or juncture portion 14 is reinforced by reinforcing means, generally designated by the reference numeral 21, which is preferably an adhesive or bonding media, such as thermosetting cement, which is adhesively compatible with the material of the container body 11 and is non-reactive with a product (not shown) packaged therein. The adhesive 21 is inserted into the upwardly opening bead 16 through the opened upper end portion (unnumbered) of the container body 11 by a nozzle N, as illustrated in phantom outline in FIGURE 2 of the drawing. During the introduction of the adhesive 21 into the bead 16 the container body 11 is preferably rotated but, in accordance with this invention, the container body 11 can remain stationary and the nozzle N rotated about the peripheral extent of the bead 16. The annular space (unnumbered) defined by the bead 16 is substantially filled and the adhesive 21 effectively bonds the lower end portion 13 of the body wall 11 to the end wall 15 of the end closure 14 to form a structurally rigid and unified container body lower end portion.

Referring now to FIGURES 3 and 4 of the drawing, reference is first made to FIGURE 3 wherein there is illustrated a conventional container which is generally referred to by the reference numeral 25. The container or can 25 includes a can body 26 having the lower end thereof closed by means of a can end which is generally referred to by the reference numeral 27. The can end 27 is secured to the can body 26 by means of a conventional double seam 28. It is to be noted that in addition to the double seam the can body 26 incudes a chuck wall 29 and an end panel 30. The end panel 30 is connected to the chuck wall 29 by means of a chuck radius 31.

Normally the can end 27 is formed of a sufficiently thick gauge metal so as to resist deformation due to internal pressures within the can 25. However, some thinning of the metal does occur at the chuck wall 29 and the chuck radius 31 during the formation of the double seam 28. In addition, it has been found that the high pressure within the can 25 reacts against the relatively large area of the end panel 30 and results in the axially outward buckling and bulging of the end panel. Further, as the end panel 30 bulges outwardly it exerts a radially inwardly directed force on the chuck wall 29 through the chuck radius 31 with the result that the chuck wall 29 is deformed radially inwardly and the can end 27 generally bends along the chuck radius 31. As a result, the can end 27 is deformed to form a gap which is sufficient to destroy the seal of the double seal 28 between the chuck wall 29 and the can body 26.

In further accordance with this invention reinforcing means, generally designated by the reference numeral 35, is disposed at a juncture portion (unnumbered) defined by a peripheral area between the chuck radius 31 and the can body 26. The reinforcing means 35 corresponds identically in structure and function to the reinforcing means 21 of the container 10 of FIGURES 1 and 2. However, in addition to bonding the chuck wall 29 to the can body 26 to form a rigid structural unit, the adhesive 35 is also preferably impermeable to air and additionally acts as a seal to prevent the introduction of air into the interior of the container through the folds of the double seam 28, as well as preventing the escape of a product packaged in the container outwardly thereof through the double seam.

Another container constructed in accordance with this invention is illustrated in FIGURES 5 and 6 of the drawing, and is generally designated by the reference numeral 40. The container 40 includes a container body 41 which terminates in an upper threaded neck 42. A lower end portion of the container body 41 is generally designated by the reference numeral 43, and includes a lower closure, generally designated by the reference numeral 44. The lower closure 44 includes an end wall 45 of a desired predetermined thickness joined by a juncture portion or bead 46 to the lower end portion 43 of the container body 41. The juncture portion or bead 46 is defined by a radially innermost sloping peripheral wall 47, a radially outermost, inwardly and downwardly sloping wall 48, and a radius portion 50.

The container 40 is preferably constructed from polymeric material, such as polyethylene or similar plastic material, and is preferably formed by a blow-molding operation. Following conventional blow-molding practice, a tube of flowable plastic material is extruded into a split-mold having a cavity corresponding to the external configuration of the container 40. Upon the closing of the mold halves of the split-mold and the introduction of a pressurized media into the tube of plastic material, the latter expands to the configuration of the mold cavities. Those portions of the tubular material which expand more than other portions tend to thin appreciably and undesirably more, as is true of the junction portion 46 of the container 40. During the blow-molding of the container 40, the material at the juncture of the bottom portion 43 and the end wall 45 is blown or forced axially downwardly to form the resultant undesirably thinned juncture portion or bead 46. Thus, there is an appreciable weakening at the juncture portion 46 which, in accordance with this invention, is again reinforced by reinforcing means, generally designated by the reference numeral 51. The reinforcing means 51 correspond to the reinforcing means 21, 35 hertofore described and functions to rigidly structurally unite and bond together the end wall 45 and the bottom portion 43 of the container body 41 across the weakened juncture portion 46, thereby serving to rigidly unite and rigidify the bottom end portion 43 of the container 40.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. A container comprising a container body joined to an end by a juncture portion, said body, end and juncture portion being of an integral one-piece plastic construction, said juncture portion having an undesirably thin wall of a thickness substantially less than the wall thickness of at least one of said body and said end caused by excessive material flow at said juncture portion during the manufacture of said container, and reinforcing means consisting solely of a layer of an adhesive which is adhesively compatible with the material of and adhesively bonded to said juncture portion for reinforcing the latter.

2. The container as defined in claim 1 wherein said reinforcing means is a layer of thermosetting adhesive.

3. The container as defined in claim 1 wherein said end includes a recessed panel whereby said juncture portion defines a bead opening into an interior of said body, and said reinforcing means is housed in said bead.

4. The container as defined in claim 3 wherein said reinforcing means is a layer of thermosetting adhesive.

5. The container as defined in claim 1 wherein said container is of a molded polymeric material construction.

6. The container as defined in claim 1 wherein said container is of a drawn construction.

7. The container as defined in claim 1 wherein said container is of an extruded construction.

8. A container comprising a container body joined to an end by a folded seam, said seam including a chuck wall and a recessed end panel, a juncture portion between said body and said chuck wall, said juncture portion having an undesirably thin wall of a thickness substantially less than the wall thickness of at least one of said body and said end caused by excessive material flow at said juncture portion during the seaming of said folded seam, and reinforcing means consisting solely of a layer of an adhesive which is adhesively compatible with the material of and adhesively bonded to said juncture portion for reinforcing the latter.

9. The container as defined in claim 8 wherein said reinforcing means is a layer of thermosetting adhesive.

References Cited

UNITED STATES PATENTS

| | | | |
|---|---|---|---|
| 245,441 | 8/1881 | Burnett | 220—73 |
| 761,890 | 6/1904 | Kepler | 150—2.1 |
| 1,441,674 | 1/1923 | Foster et al. | 220—73 |
| 2,154,349 | 4/1939 | O'Brien | 220—67 |
| 2,959,812 | 11/1960 | Allen | 264—267 |
| 3,016,578 | 1/1962 | Rohe | 264—328 |
| 3,250,429 | 5/1966 | Gesell | 150—.5 |
| 3,252,492 | 5/1966 | Marchant | 150—.5 |
| 3,266,491 | 8/1966 | Koslow | 150—.5 |
| 3,266,558 | 8/1966 | Meissner | 150—.5 |
| 3,286,876 | 11/1966 | Ring | 206—73 |

RAPHAEL H. SCHWARTZ, *Primary Examiner.*